United States Patent [19]

Campbell

[11] Patent Number: 4,497,461
[45] Date of Patent: Feb. 5, 1985

[54] SNUBBING APPARATUS FOR AN AIRCRAFT CONTROL SURFACE ACTUATOR

[75] Inventor: Dennis R. Campbell, Lynnwood, Wash.

[73] Assignee: The Boeing Company, Seattle, Wash.

[21] Appl. No.: 422,530

[22] Filed: Sep. 24, 1982

[51] Int. Cl.³ .............................................. B64C 19/00
[52] U.S. Cl. .................................... 244/75 R; 74/526; 244/213
[58] Field of Search ................... 244/75 R, 213, 214, 244/215, 87, 90 R, 224, 75 A; 92/85 R; 188/374, 268, 297; 293/136, 107; 464/33; 16/82, 86 A, 375; 74/526

[56] References Cited

U.S. PATENT DOCUMENTS

| 136,040 | 2/1873 | Darrell | 16/375 |
|---|---|---|---|
| 367,742 | 8/1887 | Byrne | 16/375 |
| 874,150 | 12/1907 | Young | |
| 2,516,406 | 7/1950 | Moyer | 244/216 |
| 2,756,951 | 7/1956 | Hanson et al. | 244/75 R |
| 2,997,325 | 8/1961 | Peterson | 293/1 |
| 3,039,757 | 6/1962 | Barr | 188/268 |
| 3,209,864 | 10/1965 | Boyd | 188/1 |
| 3,380,557 | 4/1968 | Peterson | 188/1 |
| 3,398,812 | 8/1968 | Peterson | 188/1 |
| 3,638,767 | 2/1972 | Elsner et al. | 188/297 |
| 3,867,750 | 2/1975 | Bleyker | 74/526 |
| 4,034,958 | 7/1977 | Masclet | 92/85 B |
| 4,121,483 | 10/1978 | Sedlock | 464/33 |

Primary Examiner—Galen Barefoot
Attorney, Agent, or Firm—Delbert J. Barnard; Joan H. Pauly

[57] ABSTRACT

A snubber (12) includes a fixed member (14) and a movable member (16). A variable volume chamber (20) is defined between these two members (14, 16). The chamber (20) includes an orifice (22). A body of extrusible material (26) substantially fills the chamber (20). A rotary actuator (6) carries a lug (28) that contacts the movable member (16) when the actuator (6) moves beyond a predetermined position. This contact pushes the movable member (16) against the extrusible material (26) to decrease the volume of the chamber (20) and to cause the extrusible material (26) to be extruded through the orifice (22). This stops the rotation of the actuator (6) and absorbs its kinetic energy. The snubber (12) is supported by a frame member (10). Preferably, the frame member (10) has a cavity (40) into which material extruded through the orifice (22) is received.

13 Claims, 8 Drawing Figures

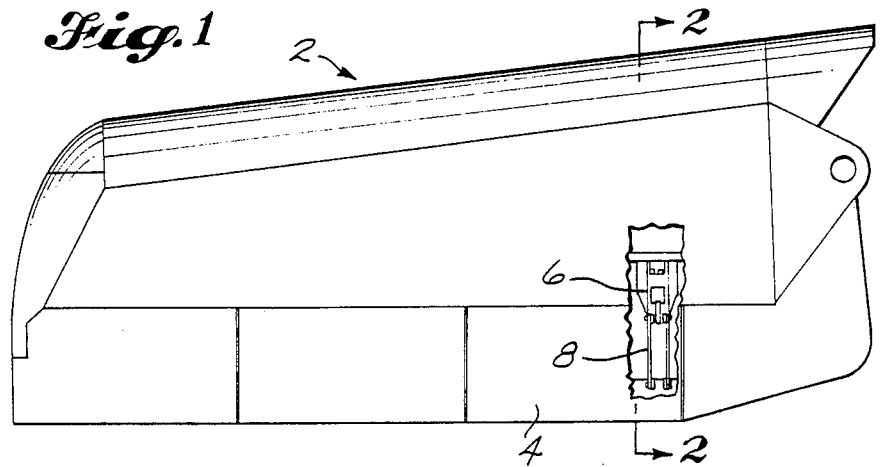
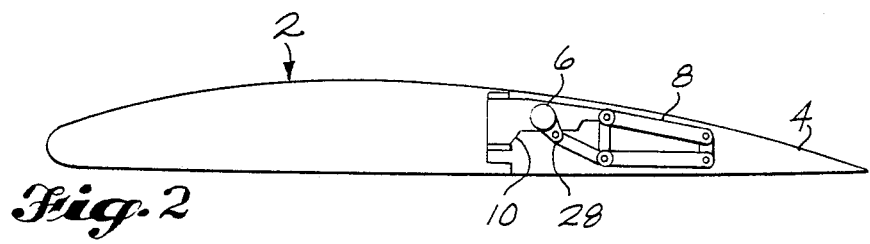
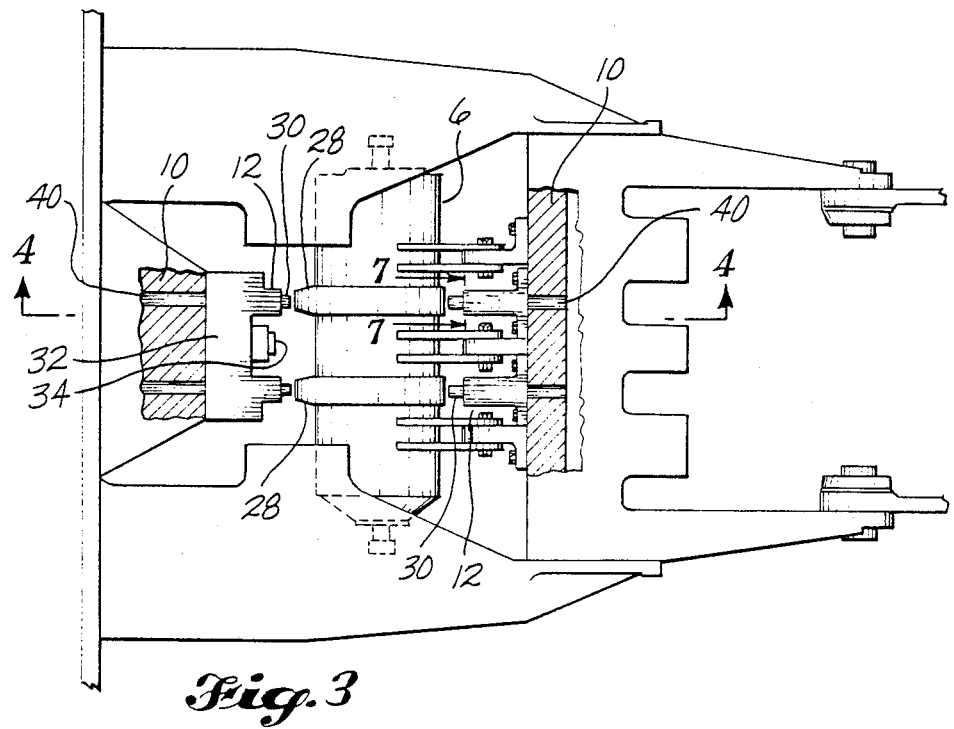

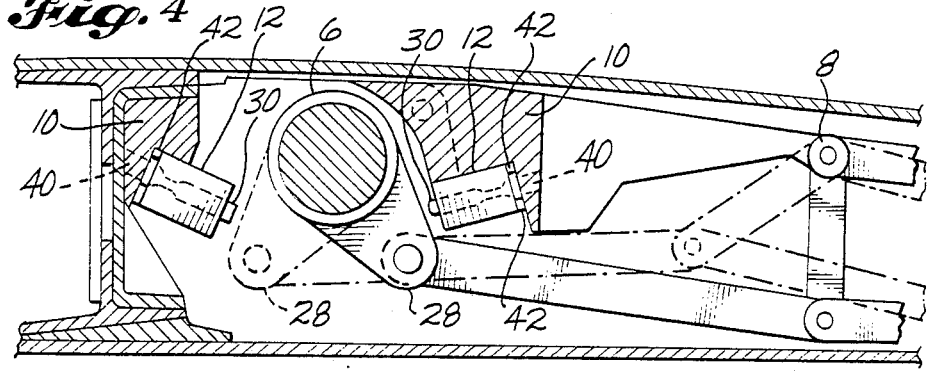
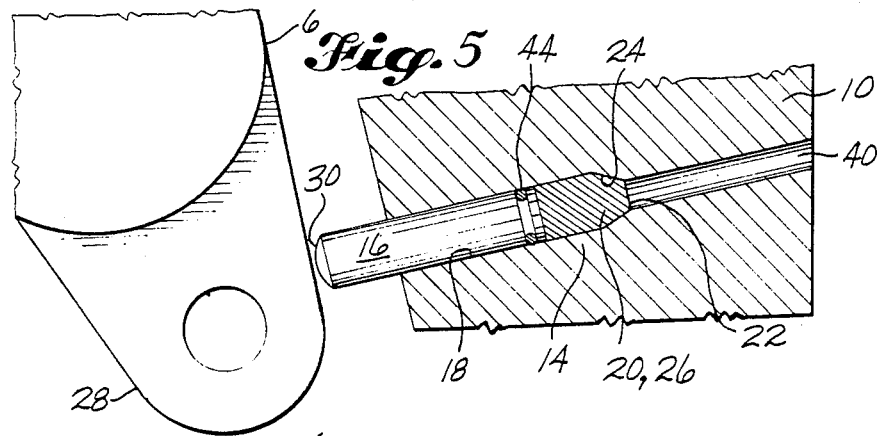
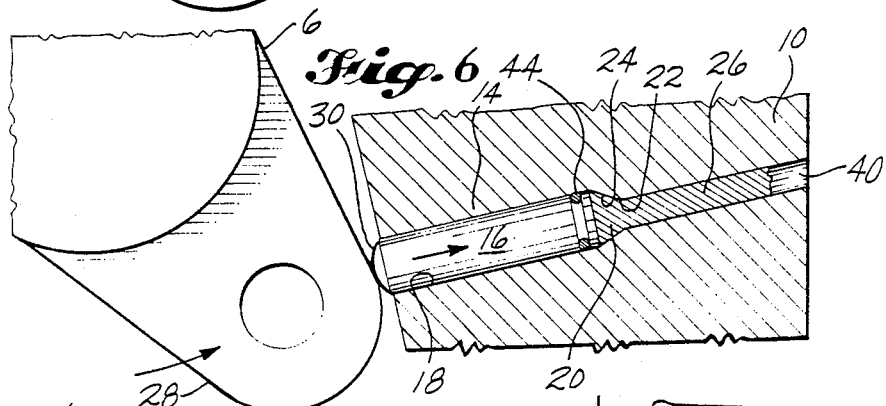
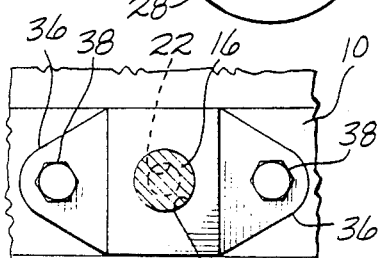
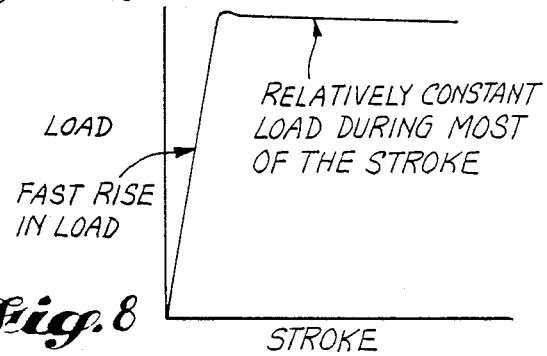

SNUBBING APPARATUS FOR AN AIRCRAFT CONTROL SURFACE ACTUATOR

GOVERNMENT RIGHTS

The government has rights in this invention pursuant to Contract No. F33615-78-C-3027 awarded by the U.S. Air Force.

DESCRIPTION

1. Technical Field

This invention relates to snubbing devices and, more particularly, to a snubber that stops the motion of an aircraft control surface actuator and absorbs its kinetic energy by extruding extrusible material out of a variable volume chamber.

2. Background Art

In a modern aircraft, there are typically a number of movable control surfaces for controlling and varying the aerodynamic characteristics of the aircraft. Examples of such control surfaces are the flaps and spoilers that are commonly used to control airflow characteristics. Movement of the control surfaces is produced by actuators, which can take any of a number of known forms.

Serious problems arise in such control systems when a system failure causes an actuator to exceed its intended range of travel. A system failure could be caused by an error in the computer that controls the actuator, a brake failure, an incorrect setting of a shut-off switch, or any other factor that would cause the actuator to continue moving beyond its normal stop position. Such system failures can cause extensive internal damage to a complex and expensive actuator if the motion of the actuator is not checked before the actuator bottoms out or before a portion of it strikes a solid structure. In addition, a system failure can cause linkages attached to the actuator to bottom out and become damaged and also possibly damage the surrounding structure of the aircraft. In the case of a rotary actuator with projecting lugs, the damage caused by a system failure can also include damage to the surrounding structure struck by the lugs.

There are various known methods of checking motion and absorbing kinetic energy. These include placing a honeycomb structure in the path of the device that is moving, providing a hydraulic snubber, and causing the moving structure to compress a spring. Each of these methods has the disadvantage of requiring a good deal of space. In many aircraft environments, especially in supersonic wings with complex linkage mechanisms, there is very little space available for an energy absorbing device. Therefore, honeycomb structures, hydraulic snubbers, and springs cannot be used in such aircraft environments. Even without space limitations, a spring mechanism could have the disadvantage of not providing a fast enough increase in resistance to the motion.

Each of the following U.S. Patents discloses an energy absorbing device.

U.S. Pat. No. 874,150, granted Dec. 17, 1907, to E. J. Young;

U.S. Pat. No. 2,997,325, granted Aug. 22, 1961, to G. H. Peterson;

U.S. Pat. No. 3,209,864, granted Oct. 5, 1965, to C. A. Boyd;

U.S. Pat. No. 3,380,557, granted Apr. 30, 1968, to G. H. Peterson; and

U.S. Pat. No. 3,398,812, granted Aug. 27, 1968, to G. H. Peterson.

The Young patent discloses a shock absorber in which a piston ruptures a thin plate and comes to rest in a body of water. Each of the other four above-listed patents discloses a device in which a plastic material in extruded through an opening.

The above patents and the prior art that is discussed and/or cited therein should be studied for the purpose of putting the present invention into proper perspective relative to the prior art.

DISCLOSURE OF THE INVENTION

The subject of this invention is an improvement in an aircraft control system of the type having a movable control surface and an actuator for producing movement of the control surface. According to a basic aspect of the invention, the improvement comprises snubber means for stopping movement of the actuator beyond a predetermined position and absorbing its kinetic energy. The snubber means comprises a fixed member, a movable member, a variable volume chamber defined between the fixed member and the movable member, and a body of extrusible material substantially filling the chamber. The chamber includes orifice means. The improvement also includes contact means carried by the actuator for pushing the movable member, when the actuator moves beyond said predetermined position, against the extrusible material to decrease the volume of the chamber and to cause the extrusible material to be extruded through the orifice means.

According to an aspect of the invention, the actuator is a rotary actuator, and the snubber means stops rotation of the rotary actuator beyond a predetermined position. Preferably, the contact means comprises lug means projecting radially outwardly from the rotary actuator.

According to another aspect of the invention, one of the fixed and movable members is a piston member, and the other of the fixed and movable members is a cylinder member.

According to still another aspect of the invention, the fixed member comprises a housing that defines a passageway, and the movable member comprises a plunger that is slidably received into the passageway. Preferably, the plunger has an outer portion that projects outwardly from the housing, and the contact means contacts this outer portion to push the plunger against the extrusible material.

According to yet another aspect of the invention, the plunger has an inner end that partially defines the chamber and that is pushed against the extrusible material by the contact means. The orifice means is defined by the housing essentially opposite this inner end of the plunger.

The apparatus of the invention may also include receiving means for receiving material extruded through the orifice means. The receiving means may take various forms. One such form is a receiving means that comprises a cavity in a frame member of the aircraft. The cavity has an opening adjacent to the orifice means.

Another possible feature is the inclusion of mounting means for attaching the snubber means to a frame member of the aircraft. Alternatively, the snubber means may be constructed with the fixed member being an integral part of a frame member of the aircraft. This latter alternative is especially advantageous when space limitations are extreme. In addition, an integral installation adds less weight to the aircraft.

The apparatus of the invention preferably further includes lubricating means for reducing frictional resistance to extrusion of the extrusible material.

Apparatus constructed according to the invention solves the problems discussed above. The load on the snubber means rises very quickly to a predetermined preferred level so that the motion of the actuator may be stopped with only a small displacement of the movable member. Thus, a system failure in an aircraft control system is prevented from causing damage. Apparatus constructed according to the invention has the great advantage of requiring a very small amount of space. Therefore, it can be installed in aircraft structures, such as supersonic wings, in which very little space is available. Additional advantages of the apparatus of the invention are that it is very inexpensive to manufacture and that it weighs less than a spring device or a hydraulic snubber. The low weight enhances the economic advantages since it allows an effective energy absorbing system to be added to the aircraft without adding a large amount of weight to the aircraft. Considering the high cost of fuel, any savings in weight can produce large savings in fuel costs.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a top plan view of an airplane wing, with a foreground portion cut away to show the actuating apparatus for one of the flaps.

FIG. 2 is a simplified sectional view taken along the line 2—2 in FIG. 1.

FIG. 3 is a top plan view of an airplane control surface actuator and the structure surrounding it, including snubbing apparatus constructed according to the invention, with foreground portions cut away to show the cylindrical cavities in the support structure.

FIG. 4 is a sectional view taken along the line 4—4 in FIG. 3.

FIG. 5 is an elevational view of the preferred embodiment of the snubbing apparatus, with some parts shown in section and the snubber housing shown as an integral part of a frame member.

FIG. 6 is like FIG. 5 except that it shows the apparatus after the actuator lug has contacted the plunger.

FIG. 7 is taken along line 7—7 in FIG. 3 and shows a mounting arrangement for a single snubber.

FIG. 8 is a load-stroke curve showing the stroke of the plunger plotted against the load on the snubber.

BEST MODE FOR CARRYING OUT THE INVENTION

The drawings show a snubbing system that is constructed according to the invention and that also constitutes the best mode of the invention currently known to the applicant. The drawings show snubbing means 12 and its associated structures in a typical installation in the wing 2 of a supersonic airplane. Such a wing typically includes a plurality of control surfaces and a plurality of actuators to provide movement of the control surfaces. In the drawings, the preferred embodiment of the apparatus of the invention is shown in association with a rotary actuator 6.

The apparatus of the invention includes snubber means for stopping movement of an actuator beyond a predetermined position and absorbing its kinetic energy. The snubber means comprises a fixed member and a movable member. A variable volume chamber is defined between the fixed member and the movable member. The chamber includes orifice means, the purpose of which will be described below. A body of extrusible material substantially fills the chamber.

Preferably, one of the fixed and movable members is a piston member, and the other of the fixed and movable members is a cylinder member. In the preferred embodiment shown in the drawings, the snubber means 12 includes a fixed cylinder member in the form of a housing 14 and a movable piston member in the form of a plunger 16. The housing 14 defines a passageway 18 into which the plunger 16 is slidably received. An inner portion of the passageway 18 forms the variable volume chamber 20. The walls of the chamber 20 are defined by the inner passageway walls and the inner end of the plunger 16. The volume of the chamber 20 varies when the plunger 16 slides within the passageway 18.

The orifice means is preferably formed at the end of the chamber 20 opposite the inner end of the plunger 16. In the preferred embodiment shown in the drawings, the orifice means 22, the passageway 18, and the plunger 16 are all circular in cross section and essentially coaxial. The diameter of the plunger 16 is essentially equal to the diameter of the passageway 18. The diameter of the orifice 22 is less than that of the passageway 18. As shown in the drawings, the portion 24 of the passageway 18 adjacent to the orifice 22 preferably tapers to provide a gradual change from the diameter of the passageway 18 to the diameter of the orifice 22. The extrusible material 26 fills the entire chamber 20 from the inner end of the plunger 16 to the orifice 22, including the portion 24 of the chamber 20 with the tapering walls.

The actuator 6 shown in the drawings is representative of rotary actuators used to move control surfaces, such as flaps, in the wings of aircraft. In apparatus constructed according to the invention, the actuator, whether rotary or linear, carries contact means for making contact with the movable member of the snubber means. The contact means and the movable member (the plunger 16 in the preferred embodiment) are positioned so that, when the actuator moves beyond its normal predetermined stop position, the contact means contacts the movable member and pushes it against the extrusible material. This decreases the volume of the chamber and causes the extrusible material to be extruded through the orifice means. In the preferred embodiment shown in the drawings, the inner end of the plunger 16 is pushed against the extrusible material 26 by the contact means 28, and the extrusible material 26 is extruded through the orifice 22 defined by the housing 14 essentially opposite the inner end of the plunger 16. (See FIG. 6).

In the preferred embodiment, the plunger 16 has an outer portion 30 that projects outwardly from the housing 14, and the contact means comprises lug means projecting radially outwardly from the rotary actuator 6. As shown in the drawings, the rotary actuator 6 preferably has two lugs 28, each of which contacts the outer portion 30 of a plunger 16 to push the plunger 16 against the extrusible material 26. In a typical installation such as that shown in the drawings, there are four snubbers 12 provided for each rotary actuator 6. Two of the snubbers 12 are positioned to stop rotation of the actuator 6 in one direction, and the other two snubbers 12 are positioned to stop rotation of the actuator 6 in the opposite direction.

In FIGS. 3 and 4, each of the snubbers 12 is provided with mounting means for attaching the snubber 12 to a frame member of the aircraft (a frame member 10 of the wing in the embodiment shown in the drawings). One method of mounting the snubbers 12 is to join the housings 14 of two snubbers 12 into an integral structure 32 and to attach this integral structure 32 to the frame member by conventional fastening means, such as a bolt 34. (See the left side of FIG. 3) The integral structure 32 is dimensioned so that the two plungers 16 are spaced properly to contact the two lugs 28 on the actuator 6. Another method is to mount each snubber 12 individually by means of the mounting ears 36 and bolts 38 shown in FIG. 7.

FIGS. 5 and 6 illustrate an alternative to mounting the snubbers 12 on a frame member. This alternative is to form the passageways 18 for receiving the plungers 16 in the frame member itself. In such an installation, the housing 14 of the snubber 12 is an integral continuation of the frame member. This arrangement has the advantages of providing a very firm support for the snubbers 12 and of requiring a very minimal amount of space.

Material extruded through the orifice means naturally must fill some space exterior to the chamber. Therefore, the apparatus of the invention preferably includes receiving means for receiving material extruded through the orifice means. In the preferred embodiment, the receiving means includes a cavity in the frame member 10 to which the snubber 12 is attached or of which the housing 14 is a part. As shown in the drawings, the cavity 40 in the frame member 10 preferably takes the form of a cylindrical passage 40 extending into the frame member 10. This passage 40 is coaxial with the passageway 18 that receives the plunger 16 and has an opening adjacent to the orifice 22 in the housing 14 of the snubber 12. The orifice 22 extends to the end of the housing 14 to provide communication between the chamber 20 and the cylindrical passage 40 in the frame member 10.

In order to illustrate the operation of the apparatus of the invention, its operation in a typical installation will be described. In a typical airplane wing, such as the one shown in FIGS. 1 and 2, there are a number of flaps each of which is moved by one or more actuators. The drawings show one type of actuator 6 that may be used to move the wing flaps 4. As described above, this actuator 6 is rotary and has two lugs 28 projecting radially therefrom. These lugs 28 each have two functions, providing the means for activating the snubber 12 and providing the means of attachment for the linkage 8 between the actuator 6 and the wing flap 4.

Four snubbers 12 are installed in association with each actuator 6 to prevent rotation beyond a predetermined position (see FIGS. 3-5) in either direction as described above. When there is a system failure that causes the actuator 6 to rotate beyond either of its normal predetermined stop positions, each lug 28 contacts a plunger 16 in one of the snubbers 12 and pushes the inner end of the plunger 16 against the extrusible material 26. As the plunger 16 moves inwardly, the volume of the chamber 20 is decreased and the extrusible material 26 is extruded through the orifice 22 into the cylindrical passage 40 in the frame member 10.

Excessive friction resisting sliding movement of the plunger 16 and extrusion of the material 26 is prevented by providing a lubricant around the sidewalls of the passageway 18 (including the chamber 20) and by the tapering of the chamber sidewalls toward the orifice 22. Lubrication can be accomplished, for example, by coating, the sidewalls of the passageway 18 with a hard lubricant or by coating the body of extrusible material 26 and the sides of the plunger 16 with a grease lubricant before assembling the snubber 12. Any of a number of common aircraft lubricants may be used for this purpose. The reduction in frictional resistance helps to ensure tha the load on the actuator does not exceed a predetermined desired level during any part of the stroke of the plunger 16.

FIG. 8 illustrates a typical curve showing the stroke of the plunger 16 plotted against the load on the snubber 12. This curve illustrates the fast rise of the load to a predetermined preferred level and the relatively uniform load during the majority of the stroke of the plunger 16. The load rises very quickly, for example with only a 0.02 inch displacement of the plunger 16, and the total displacement of the plunger 16 is quite small, for example approximately 0.125 inch. The result is that the rotation of the actuator 6 is stopped very quickly with only a small rotation beyond the normal range, and the kinetic energy of the actuator 6 is quickly and efficiently absorbed by the snubber 12. Once the kinetic energy has been absorbed, the actuator 6 stalls and comes to rest with the lugs 28 still in contact with the outer ends 30 of the plungers 16. The snubbing action can be adjusted so that the lugs 28 will never come into contact with the housings 14 of the snubbers 12.

Although the apparatus of the invention stops the actuator's motion quickly, the stoppage is not as sudden as it would be if the lugs or some other portion of the actuator hit a solid structure. In the latter case, the load on the internal mechanisms of the actuator rises to an extremely high level and there is a tremendous shock to the actuator. This causes internal damage, for example, the breaking off of gear teeth. The apparatus of the invention prevents such damage by absorbing the kinetic energy of the actuator and limiting the load experienced by the actuator and its internal mechanisms.

When the apparatus of the invention has been activated to stop the movement of the actuator and the actuator has come to rest, the snubbers need to be reset before they will again absorb the design rated kinetic energy. This is not a problem since a modern aircraft can be flown and safely landed for maintenance with one flap nonfunctional. In addition, since the snubbers have prevented damage to the control system due to overtravel of the actuator, it may be possible to continue to use the flap with restricted flap travel and thereby provide an additional safety margin. This would be possible when the system failure was caused by, for example, a misplaced overtravel shut-off switch and the plungers 16 have not undergone their full displacement. In such a situation, the snubbers 12 are still capable of absorbing kinetic energy so that, if the plungers 16 are struck a second time, damage to the aircraft is prevented.

The apparatus of the invention can, in any case, be used a number of times with a minimal amount of maintenance. This maintenance can be accomplished by shimming the space between the housing 14 of the snubber 12 and the frame member 10 as shown at 42 in FIG.

4, adding more extrusible material, or changing the length of the plunger 16.

Similarly, the profile of the load-stroke curve and the resulting load on the actuator can be varied to meet the requirements of different situations. The means of control include the choice of the extrusible material and the sizing of the orifice with respect to the diameter of the extrusible material; that is, the diameter of the untapered portion of the chamber. In sizing the orifice, the orifice diameter and/or the orifice entry angle may be varied. Other factors that may be varied to adjust the load characteristics of the snubber are the longitudinal extent of the extrusible material and the chamber and the type of lubricant used. By carefully adjusting each of the control factors, the apparatus of the invention may be precisely tailored to fit the need of each particular environment in which it is to be installed.

In some situations, there is a need for a long body of extrusible material and for several repeated load applications on the snubber with minimal maintenance. In such situations, the plunger may need a seal 44 to retain the lubricant around the body of extrusible material. There are a number of known high pressure seals that would be suitable for this purpose. The inclusion of a seal in the apparatus of the invention helps to ensure a uniform load during the majority of the stroke of the plunger.

A variety of materials and/or combinations of materials are suitable for forming the body of extrusible material. In general, metallic materials, such as a soft copper, aluminum, or brass, are most suitable. In addition, certain plastic materials may also be suitable when the requirements call for a low load capability. Since the choice of the material affects the load-stroke curve, the desired characteristics of the curve will generally be decisive in determining the extrusible material to be used in a particular situation.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. In combination with an aircraft control system of the type having a movable control surface, and an actuator for producing movement of said control surface, the improvement which comprises:

snubber means for stopping movement of a movable portion of the actuator beyond a normal predetermined stop position and absorbing its kinetic energy; said snubber means comprising a fixed member, a movable member, a variable volume chamber defined between the fixed member and the movable member, said chamber including orifice means, and a body of extrusible material substantially filling the chamber; and contact means carried by said movable portion of the actuator for contacting the movable member when said movable portion of the actuator moves beyond said predetermined position and pushing the movable member against the extrusible material to decrease the volume of the chamber and to cause the extrusible material to be extruded through the orifice means.

2. The combination described in claim 1, in which the actuator is a rotary actuator, and the snubber means stops rotation of the rotary actuator beyond a predetermined position.

3. The combination described in claim 2, in which the contact means comprises lug means projecting radially outwardly from the rotary actuator.

4. The combination described in claim 1, in which one of said fixed and movable members is a piston member, and the other of said fixed and movable members is a cylinder member.

5. The combination described in claim 1, in which the fixed member comprises a housing that defines a passageway, and the movable member comprises a plunger that is slidably received into the passageway.

6. The combination described in claim 5, in which the plunger has an outer portion that projects outwardly from the housing, and the contact means contacts said outer portion to push the plunger against the extrusible material.

7. The combination described in claim 6, in which the actuator is a rotary actuator, the snubber means stops rotation of the rotary actuator beyond a predetermined position, and the contact means comprises lug means projecting radially outwardly from the rotary actuator.

8. The combination described in claim 5 or claim 6, in which the plunger has an inner end that partially defines the chamber and that is pushed against the extrusible material by the contact means, and the orifice means is defined by the housing essentially opposite said inner end.

9. The combination described in claim 8, further comprising receiving means for receiving material extruded through the orifice means, said receiving means including a cavity in a frame member of the aircraft, said cavity having an opening adjacent to the orifice means.

10. The combination described in claim 1, further comprising mounting means for attaching the snubber means to a frame member of the aircraft.

11. The combination described in claim 1 or claim 5, in which the fixed member is an integral part of a frame member of the aircraft.

12. The combination described in claim 1, further comprising lubricating means for reducing frictional resistance to extrusion of the extrusible material.

13. The combination described in claim 5, further comprising lubricating means for reducing frictional resistance to sliding of the plunger in the passageway and extrusion of the extrusible material.

* * * * *